United States Patent [19]
Hayden et al.

[11] Patent Number: 5,775,365
[45] Date of Patent: *Jul. 7, 1998

[54] FLOOD PROTECTION SEWER BACKFLOW CONTROL VALVE AND ADAPTER ASSEMBLY

[75] Inventors: Stuart E. Hayden, Louisville; Douglas A. Kieper, Finchville; George H. Hunt, Louisville, all of Ky.

[73] Assignee: Nibco, Inc., Elkhart, Ind.

[*] Notice: The term of this patent shall not extend beyond the expiration date of Pat. No. 5,577,531.

[21] Appl. No.: 756,057

[22] Filed: Nov. 26, 1996

Related U.S. Application Data

[63] Continuation of Ser. No. 566,062, Dec. 1, 1995, Pat. No. 5,577,062.

[51] Int. Cl.$^6$ .................................................... F16L 5/00
[52] U.S. Cl. ..................... 137/369; 137/370; 137/371; 137/614.2; 251/292
[58] Field of Search ............................. 137/369, 370, 137/371, 614.2; 251/292

[56] References Cited

U.S. PATENT DOCUMENTS

| | | | |
|---|---|---|---|
| 1,759,221 | 5/1930 | Carson. | |
| 2,608,203 | 8/1952 | Butler | 137/171 |
| 2,718,238 | 9/1955 | Simko, Sr. | 137/527.2 |
| 2,827,914 | 3/1958 | Alters | 137/364 |
| 3,537,471 | 11/1970 | Houle | 137/370 |
| 3,891,181 | 6/1975 | Sanders | 251/128 |
| 4,497,344 | 2/1985 | Kisiel | 137/797 |
| 5,327,925 | 7/1994 | Ortel | 137/371 |

*Primary Examiner*—A. Michael Chambers
*Attorney, Agent, or Firm*—Middleton & Reutlinger

[57] ABSTRACT

The present invention relates to a basement sewer backflow control valve with adapter. A valve such as a ball valve is positioned a sewer line under the floor of a basement with an adapter extending vertically through the basement floor providing a means for opening and closing the valve as needed to ensure flood waters do not backflow into the basement during flooding. The valve and adapter may also be utilized in combination with an in-line check valve. The adapter provides a flush surface with the basement floor.

15 Claims, 6 Drawing Sheets

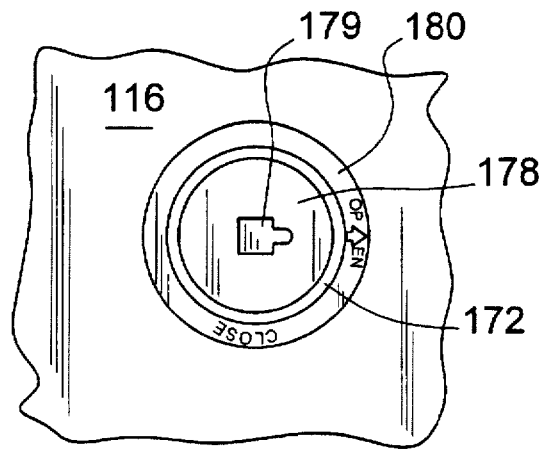
FIG. 10
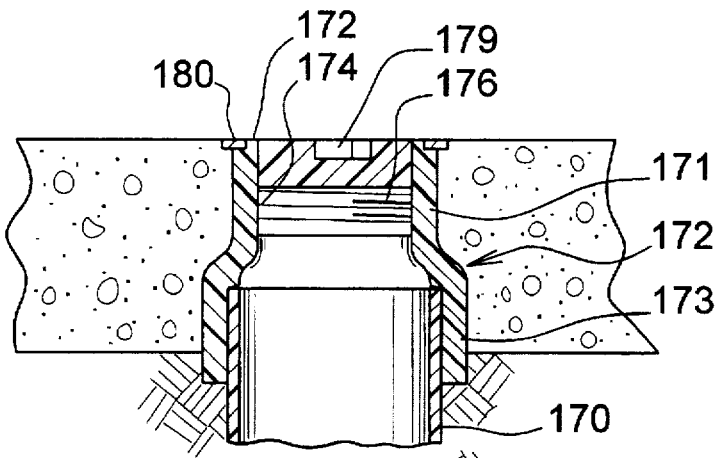
FIG. 9
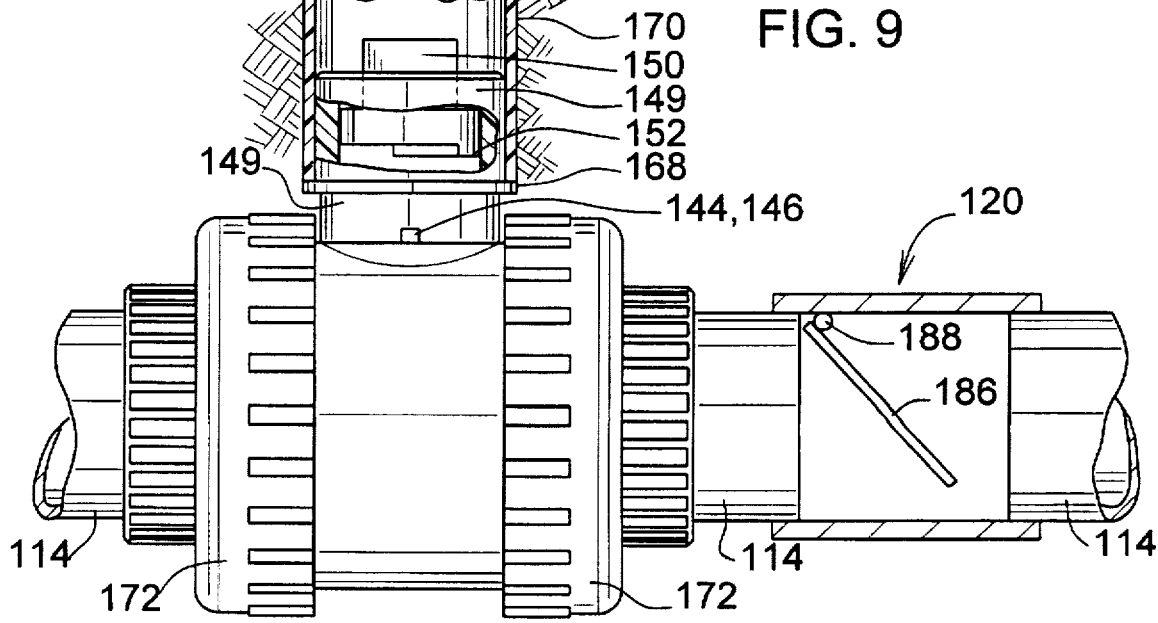

5,775,365

1

FLOOD PROTECTION SEWER BACKFLOW CONTROL VALVE AND ADAPTER ASSEMBLY

This is a continuation application of Ser. No. 08/566,062 filed on Dec. 1, 1995 now U.S. Pat. No. 5,577,062 issued Nov. 26, 1996.

BACKGROUND OF THE INVENTION

1. Field of the Invention

This invention relates to traps, valves, and valve adapters for use in sewer connections and the like where it is undesirable to have water or other fluid back up in the sewer line in the basements and the like during flood conditions.

The present invention relates to an in-line basement sewer flood protection backflow control valve and adapter assembly providing a means to open and close the valve sealed beneath the floor of the basement. A valve such as a ball valve is positioned a sewer line under the floor of a basement with an adapter extending vertically through the basement floor providing a means for opening and closing the valve as needed to ensure sewer flow does not backflow into the basement during flooding. The valve and adapter may also be utilized in combination with an in-line check valve. The adapter provides a flush surface with the basement floor.

2. Description of the Prior Art

Conventional flood protection consisted of a simple check valve, more particularly a "flap valve", which functions as a gate providing for one direction flow of the fluid in the sewer line away from the source such as taught in U.S. Pat. No. 2,718,238, hereby incorporated by reference. However, the check valve often becomes clogged with debris and fails to seal properly thereby permitting passage of the fluid usually resulting in the sewer backflow contaminating the basement.

SUMMARY OF THE INVENTION

The preferred flood protection sewer backflow control valve and adapter assembly selected for use in the present invention utilizes a ball valve such as manufacture by Nibco, Inc. and described in U.S. Pat. Nos. 5,360,036 and 5,427,135 incorporated herein. It is contemplated that a plug or gate type valve may be utilized as a substitute; however, a gate valve is prong to blockage and leaks due to debris becoming wedged between the gate and housing of the valve.

A typical ball valve includes a valve body including first and second flow-through ends with a valve member receiving chamber thereinbetween, and a stem receiving passage communicating with the chamber. A generally spherical valve member is disposed within the chamber. The valve member has a throughbore therein in operable alignment with the first end second flow-through ends. A stem extends through and is rotatably mounted within the stem receiving passage and engageable with the valve member for rotating the valve member in and out of flow-through alignment. An annular sealing member may be disposed within the stem receiving passage forming a seal between the stem and stem receiving passage. Rotation of the stem rotates the valve member in and out of operable alignment with the first and second flow-through ends.

The backflow control valve and adapter assembly for providing flood protection for a floor having a drain therein includes a valve, such as a ball valve having a ball valve stem extending upwardly perpendicular to the main body through a ball valve collar wherein the ball valve is connected to a conduit such as a sewer discharge pipe. The ball

2 valve collar includes a circumferential flange and at least one projection which is sized, shaped and positioned for engaging a least one complementary shaped depression formed in an exterior surface of a support mount for preventing rotation of the support mount with respect to the collar and the valve of the valve collar which has at least one notch formed in an upper edge. The drive coupling comprises a generally cylindrical tube member having a tab extending from a bottom edge engaging a complementary sized and shaped notch of the collar for preventing a drive coupling from rotating axially upon the collar. The collar has a bottom end defining an aperture complementary sized and shaped for engaging a top portion of the stem . The top end has an aperture complementary sized and shaped for engaging a distal end of a stem rotating rod for turning the valve open and close. A support mount is coaxially mounted around the drive coupling which has at least one notch for engaging the projections extending from the collar for holding the support mount stationary with respect to the collar. The support mount including a means of support such as a circumferential ring is positioned at a selected distance from the lower end of the support mount. An extension conduit of a selected length having a larger diameter than the support mount is slipped coaxially over an upper end of the support mount. The distal end of the extension conduit is supported on a support means such as a flange or ring formed on the support mount for preventing supporting the adapter assembly above the valve flanges and preventing obstruction of rotation of the drive coupling and the valve stem. A female adapter having a larger diameter than the support mount is slipped coaxially around the upper portion of the extension conduit. The female adapter includes internal threads for cooperative engagement with the external threads of a plug complementary sized and shaped fitting within the female adapter. The plug includes a keyway of a corresponding size and shape of the drive coupling to facilitate insertion of the rod for turning the drive coupling, stem, and valve member.

It is an object of the present invention is to provide a means for forming an in-line sewer control valve positioned below the basement floor and having an adapter means to open and close the valve extending to the surface of the floor.

Another object is to provide a device for preventing water backup through a valve in which the parts are readily removable and replaceable.

BRIEF DESCRIPTION OF THE DRAWINGS

A better understanding of the present invention will be had upon reference to the following description in conjunction with the accompanying drawings in which like numerals refer to like parts throughout the several views and wherein:

FIG. 6 is an isometric side view of and alternate embodiment of the present invention showing a perspective view of

Figure 8:
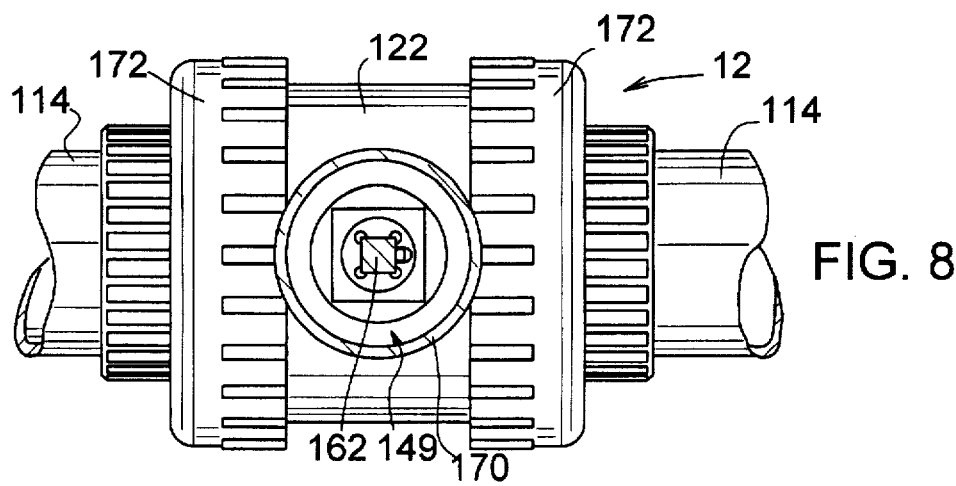
Figure 6:
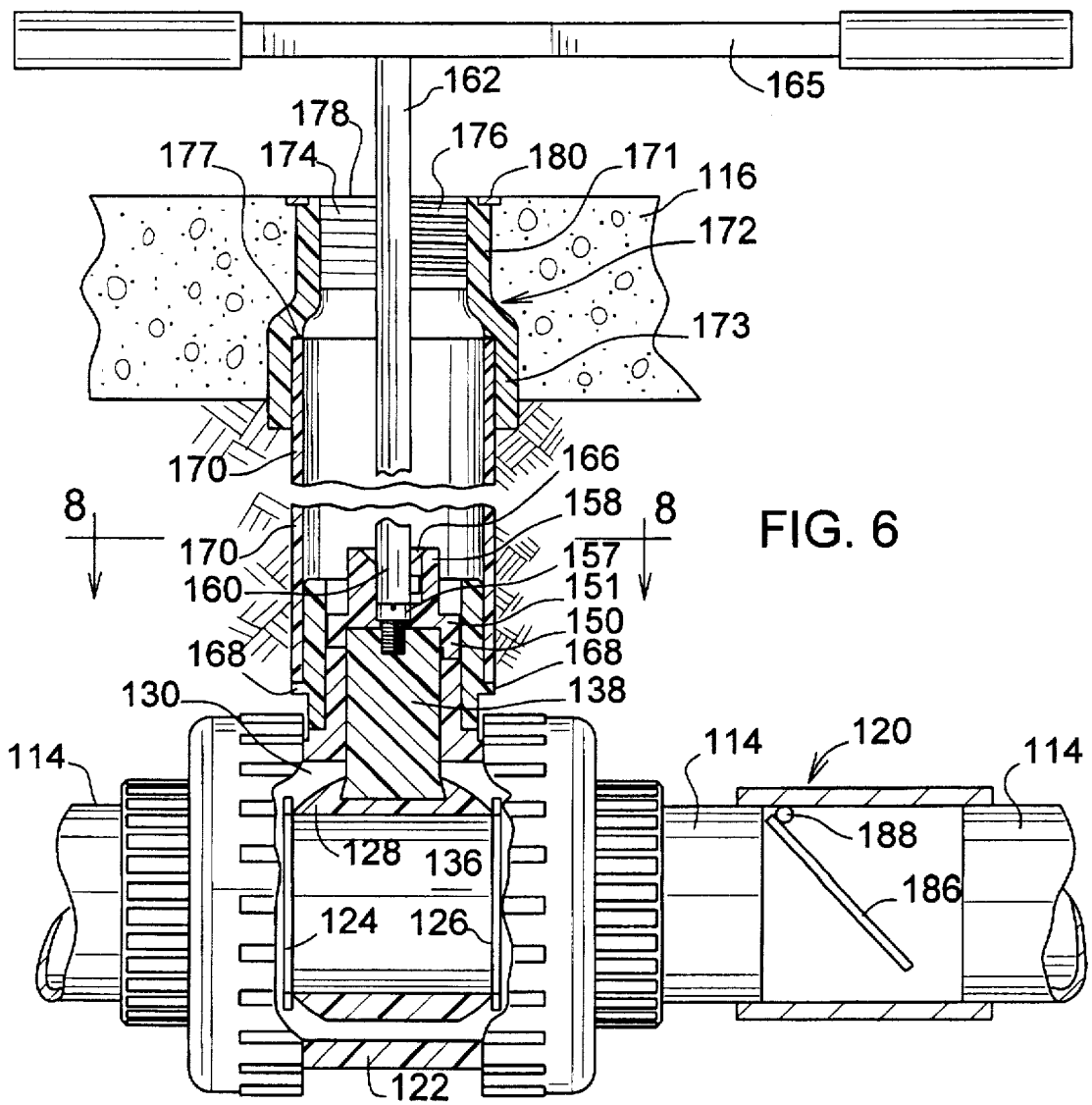
Figure 7:
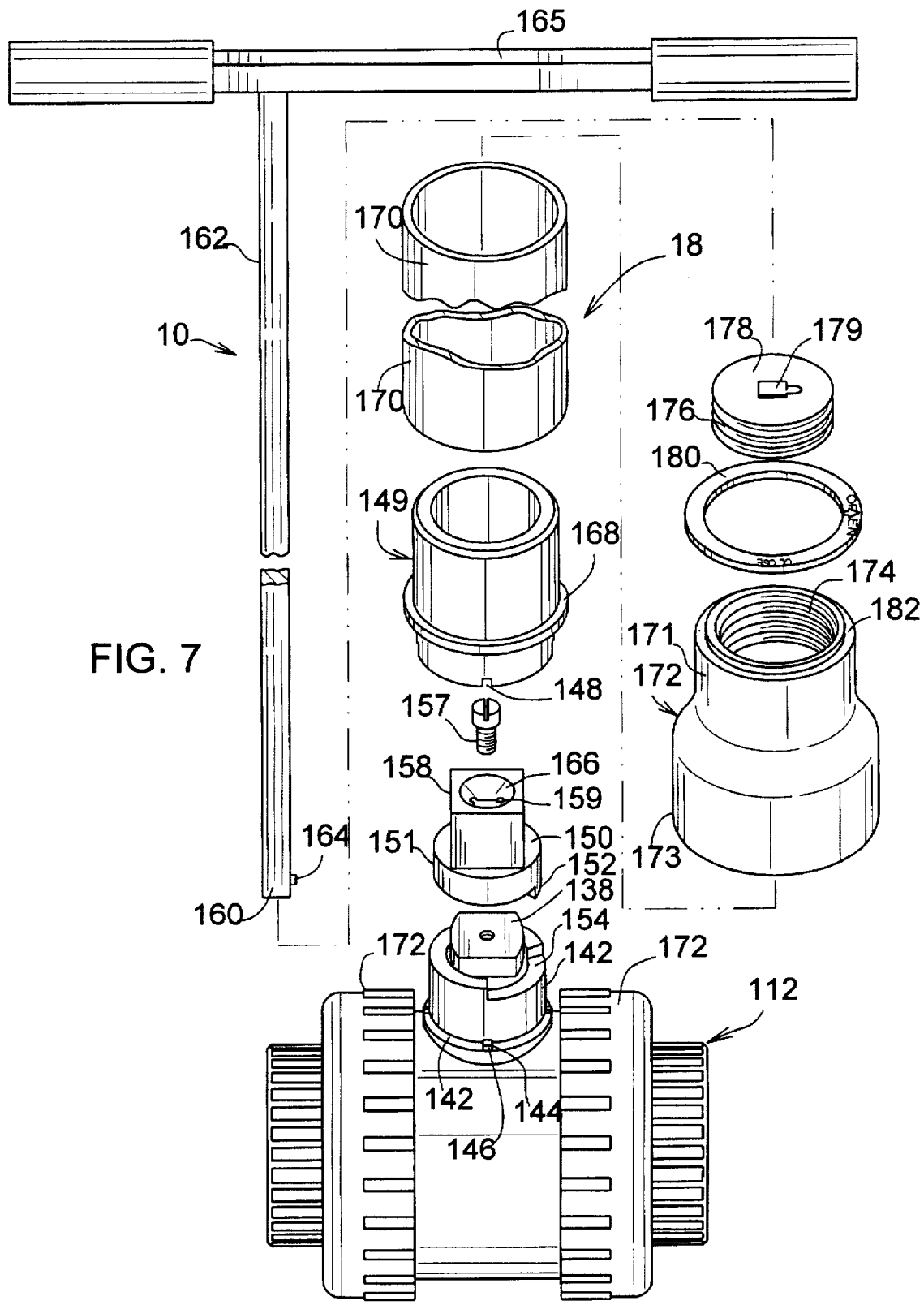

3 a ball valve shown in line with a check valve and a partial cutaway view showing the adapter assembly;

FIG. 7 is a perspective view of the FIG. 6 showing the individual parts of the adapter assembly;

FIG. 8 is a perspective view showing an alternate embodiment of a ball valve as used in the flood protection valve and adapter assembly;

FIG. 9 is an isometric side view of the present invention as shown in FIG. 6 showing the flush fit of the assembly with the floor surface; and FIG. 10 is a top view of FIG. 6.

DESCRIPTION OF THE PREFERRED EMBODIMENT

The present invention relates to a basement sewer backflow control valve and adapter assembly. A valve such as a ball valve is positioned a sewer line under the floor of a basement or other structure with an adapter assembly extending vertically through the basement floor providing a means for opening and closing the valve as needed to ensure flood waters do not backflow into the basement during flooding. The ball valve and adapter assembly may also be utilized in combination with an in-line check valve assembly. The adapter assembly provides a housing sealed within the basement floor and provides a flat top surface forming a flush surface with the basement floor.

The valve and adapter assembly of the present invention may be fabricated from metal or plastic; however, the preferred embodiment is composed of plastic such as schedule 40, 3 inch, PVC pipe. The present invention also includes a plastic ball valve. More particularly, a thermoplastic ball valve of the end entry type such as is described in U.S. Pat. Nos.: 3,550,902, 4,099,705, 4,257,575, and 4,449,694) hereby incorporated by reference.

As shown best in FIGS. 1–4, a typical ball valve 12 such as utilized in the present invention includes a valve body 22 including first and second flow-through ends with a valve member 28 having a passage therethrough positioned and rotatably held within a valve member receiving chamber 30 thereinbetween. The throughbore 36 of the valve member 28 is in operable alignment with the first end second flow-through ends 24 and 26, respectively. A stem 38 extends through and is rotatably mounted within a stem receiving passage 40 and engageable with the valve member 28 for rotating the valve member 28 in and out of flow-through alignment. An annular sealing member may be disposed within the stem receiving passage 40 forming a seal between the stem 38 and stem receiving passage. Rotation of the stem 38 rotates the valve member 28 in and out of operable alignment with the first and second flow-through ends 24 and 26, respectively.

Figure 2:
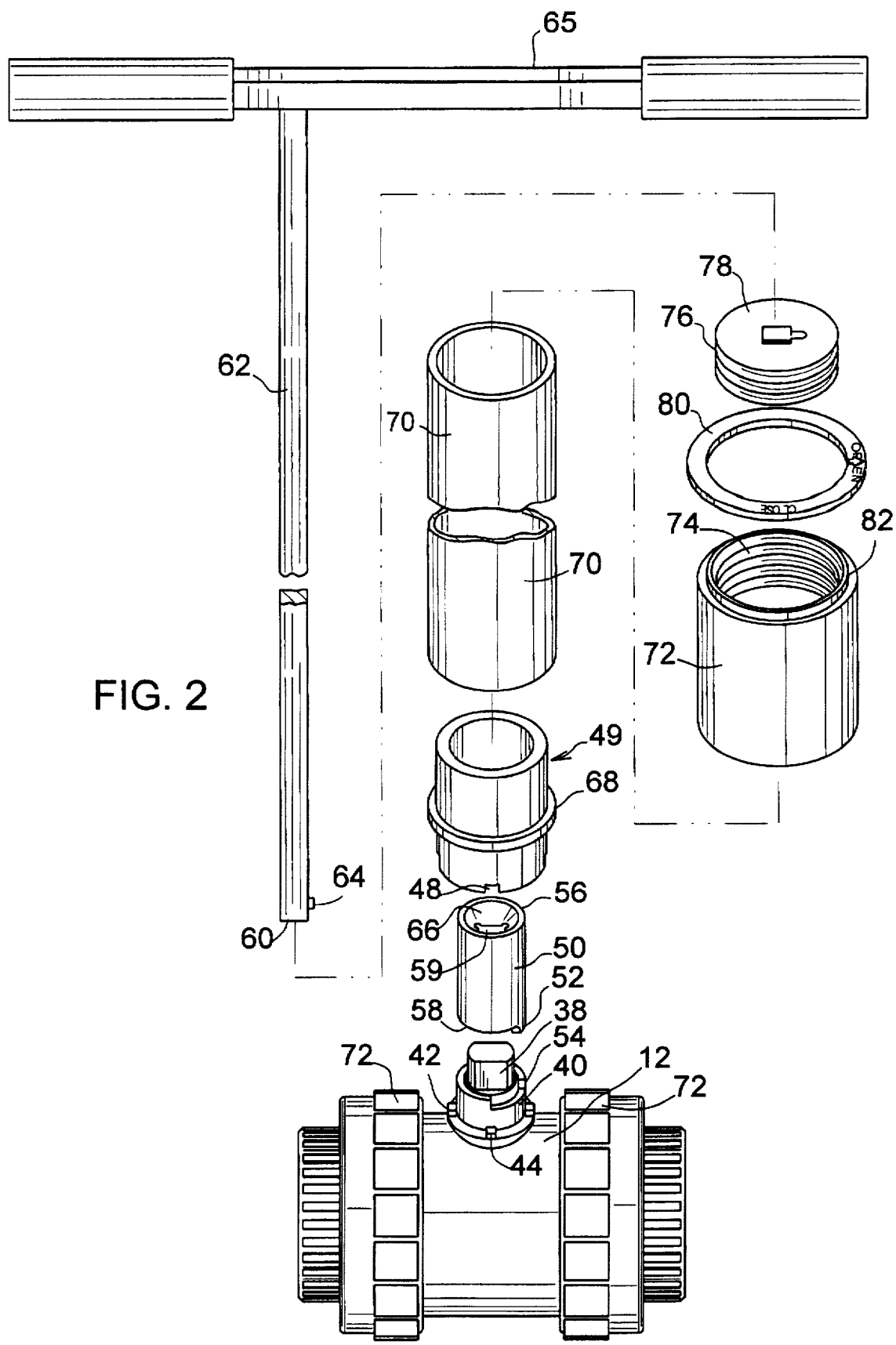
FIG. 2 is a perspective view of the present invention showing the individual parts of the adapter assembly.
Figure 5:
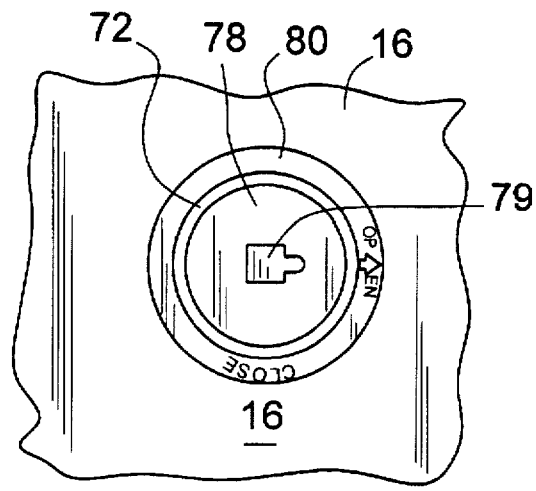
FIG. 5 is a top view of the present invention.

The adapter assembly as best shown in FIG. 2 comprises a valve collar, drive coupling, cylindrical mount, extension conduit, female adapter, plug, and locator ring.

The generally cylindrical valve stem collar 42 of the valve 12 of the present invention coaxially houses the stem 38. In the preferred embodiment as shown in FIG. 2, the collar 42 includes a circumferential flange 44 and projections 46 which are sized, shaped and positioned to engage complementary shaped depressions 48 formed in the exterior surface of the support mount 49 to prevent rotation of the mount 49 with respect to the stem collar 42 and valve 12.

The hollow drive coupling 50 comprises a generally cylindrical tube member having a tab 52 extending from the bottom edge for engaging a complementary sized and shaped notch 54 formed in the upper edge of the cylindrical collar 42. The tab 52 fits into the notch 54 to prevent the drive coupling 50 from rotating axially upon the collar 42. The bottom end 56 of the hollow drive coupling 50 is complementary sized and shaped forming a bottom aperture 51 to engage the top of the stem 38. The top end 58 of the hollow drive coupling 50 is complementary sized and shaped forming a aperture 95 to engage the distal end 60 of a stem rotating rod 62. As shown in the preferred embodiment of FIG. 1, the distal end 60 of the rod 62 is square and includes a small hex shaped screw or nut 64 oriented in the same direction as the handle 65 of the rod 62 for orienting the rod 62 and providing a means for the user to determine whether the valve 12 is open or closed. In addition, the upper end of the drive coupling 50 of the preferred embodiment is conical 66 in shape to assist the user in guiding the distal male end 60 of the rod 62 into the upper female end 56 of the drive coupling 50.

The support mount 49 fits coaxially around the drive coupling 50 and the notches 48 engage the projections 44 of the collar 42. It is contemplated that notches could be formed in the collar 42 and projections in the support mount 49 to provide an alternate means of holding the support mount 49 stationary with respect to the collar 42. The support mount 49 includes a means of support such as a circumferential flange or ring 68 generally centrally positioned with respect to the lower end of the support mount 49 at a selected distance.

An extension conduit 70 of larger diameter than the support mount 49 slides coaxially over the upper end of the mount 49. The support means or ring 68 provides a means for holding the larger diameter extension conduit 70 above the valve flanges 72 preventing obstruction upon rotation of the drive coupling 50.

Figure 3:
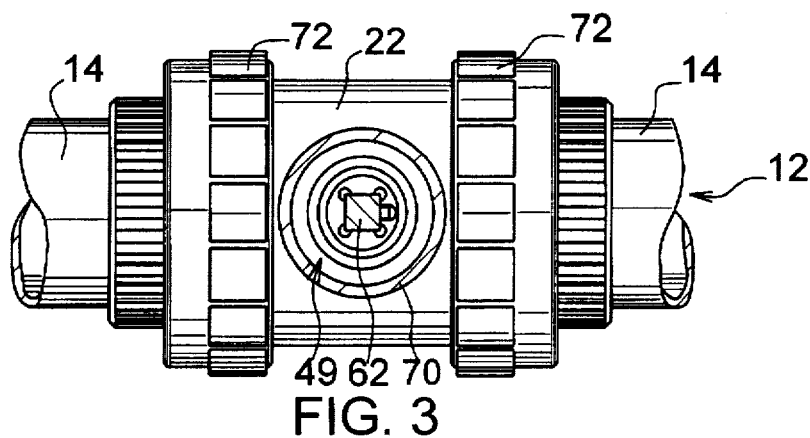
FIG. 3 is a perspective view showing a typical ball valve as used in the flood protection valve and adapter assembly.
Figure 1:
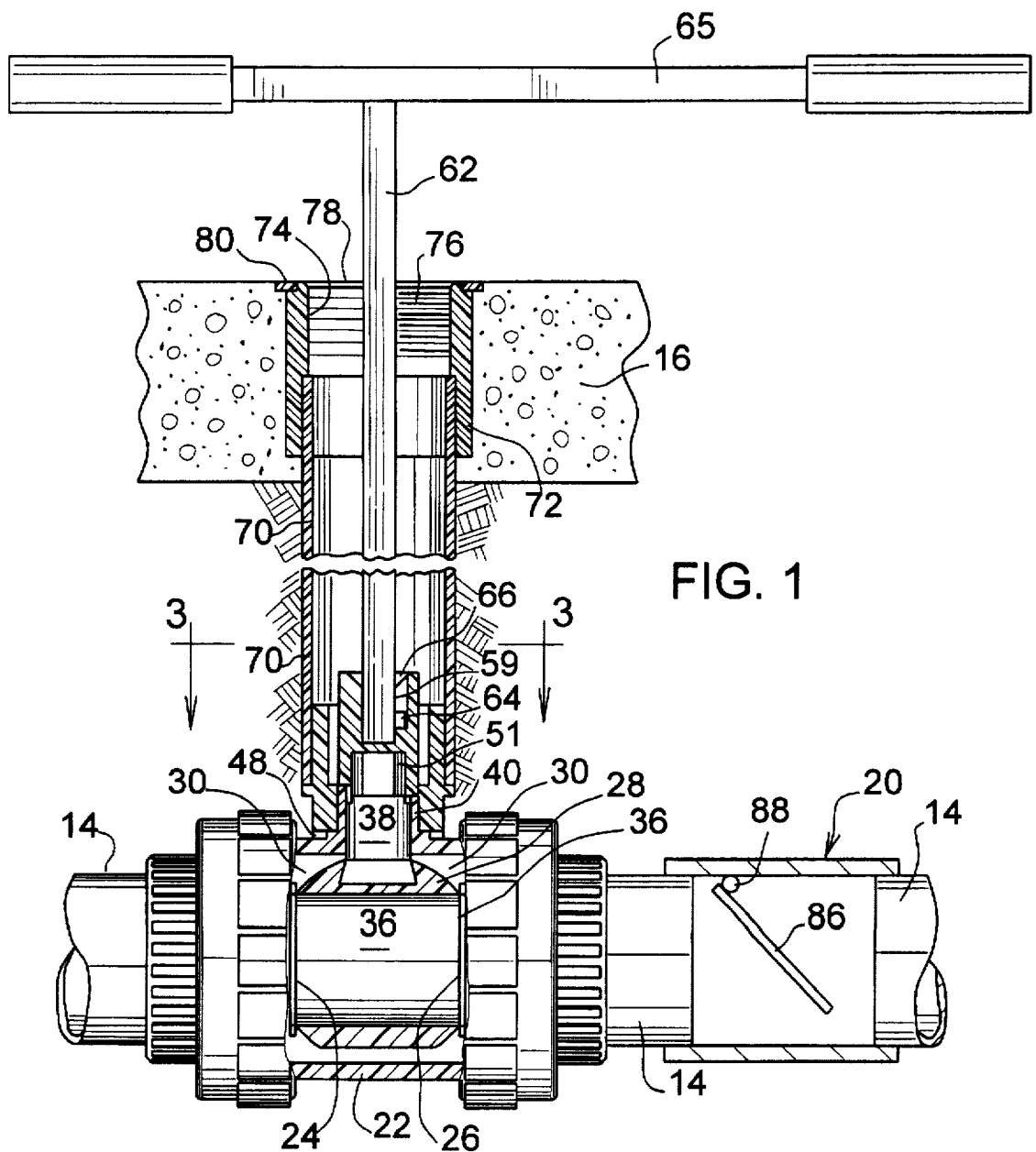
FIG. 1 is an isometric side view of the present invention showing a perspective view of a ball valve shown in line with a check valve and a partial cut-away view showing the adapter assembly.
Figure 4:
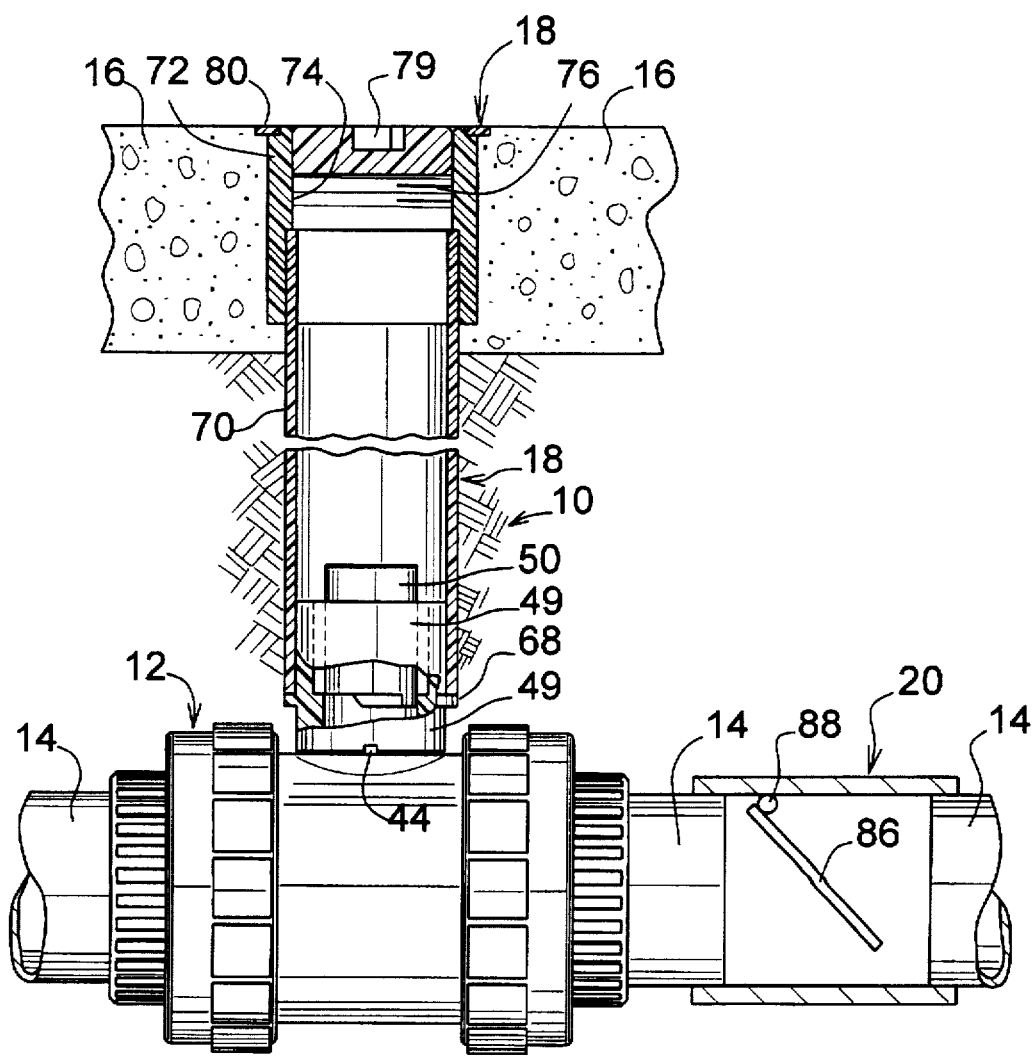
FIG. 4 is an isometric side view of the present invention as shown in FIG. 1 showing the end plug and flush fit with the floor surface.

As shown in FIGS. 1 and 4, the extension conduit 70 extends upwardly near floor level. In the preferred embodiment a female adapter 72 of larger diameter fits coaxially around the upper portion of the extension conduit 70 and is secured thereto by a fiction fitted or attached by a means such as glue. The upper portion of the female adapter 72 includes internal threads 74 for cooperable engagement with external threads 76 of a clean out plug 78. The plug 78 includes a keyway 79 or a corresponding size and shape of the drive coupling 50. A locator ring 80 is positioned around the top of the plug 78 and rests upon a flange or lip 82 formed on the upper edge of the female adapter 72.

FIGS. 1 and 4 show the female adapter 72 and extension conduit 70 are buried in the soil and or concrete at a depth which provides that the plug 78 and locator ring 80 are positioned flush with the floor. The handle 65 of the rod 66, the screw 64, plug keyway 79, and drive coupling 50 are in alignment with one another so that the user can see the ring and determine the direction of the flow and whether the valve 12 is open or close by observing the handle 165.

As shown in FIG. 1 and 4, a check valve assembly 20 comprising a flap 86 having a length greater than the diameter of the pipe 14 and pivoting hinge 88 may be inserted in the sewer line 14 downstream of the valve 12 as an additional safety precaution to aid in the prevention of backflow of water into the basement of the user.

As illustrated in FIGS. 6–9, another preferred embodiment of a ball valve 112 such as utilized in the present invention includes a valve body 122 including first and second flow-through ends with a valve member 128 having a passage therethrough positioned and rotatably held within a valve member receiving chamber 130 thereinbetween. The throughbore 136 of the valve member 128 is in operable alignment with the first end second flow-through ends 124 and 126, respectively. A stem 138 extends through and is rotatably mounted within a stem receiving passage 140 and engageable with the valve member 128 for rotating the valve member 128 in and out of flow-through alignment. An annular sealing member may be disposed within the stem receiving passage 140 forming a seal between the stem 138 and stem receiving passage. Rotation of the stem 138 rotates the valve member 128 in and out of operable alignment with the first and second flow-through ends 124 and 126, respectively.

The adapter assembly as best shown in FIG. 7 comprises a stem collar, drive coupling, retainer screw, cylindrical mount, extension conduit, female adapter, plug, and locator ring.

The generally cylindrical stem collar 142 of the valve 112 of the present invention coaxially houses the stem 138. In the preferred embodiment as shown in FIG. 7, the collar 142 includes a circumferential flange 144 and projections 146 which are sized, shaped and positioned to engage complementary shaped depressions 148 formed in the exterior surface of the support mount 149 to prevent rotation of the mount 149 with respect to the stem collar 142 and valve 112.

The hollow drive coupling 150 comprises a generally cylindrical lower portion 151 having an aperture 153 therein complementary sized and shaped for cooperative engagement with the top of the stem 138 of the valve 112. A projection or tab 152 extends from the bottom edge of the drive coupling 150 for engaging a complementary sized and shaped notch 154 formed in the upper edge of the cylindrical collar 142. The tab 152 fits into the notch 154 to prevent the drive coupling 150 from rotating axially upon the collar 142. The top end 158 of the hollow drive coupling 150 is generally square shaped providing a top male end 158 being complementary sized and shaped adapted for cooperative engagement with a female aperture formed in the bottom end of a support member 149. The top male end 158 of the drive coupling 150 forms an aperture 159 to engage the distal end 160 of a stem rotating rod 162. As shown in the preferred embodiment of FIG. 1, the distal end 160 of the rod 162 is square and includes a small hex shaped screw or nut 164 oriented in the same direction as the handle 165 of the rod 162 for orienting the rod 162 and providing a means for the user to determine whether the valve 112 is open or closed by checking the ring visibly or checking the direction of the handle 165. In addition, the upper end of the drive coupling 150 of the preferred embodiment is conical 166 in shape to assist the user in guiding the distal male end 160 of the rod 162 into the upper female end 156 of the drive coupling 150. A retaining screw 157 is located within the aperture 159 of the drive coupling 150 and positioned vertically therein fastening the drive coupling 150 to the stem 138.

The support mount 149 fits coaxially around the drive coupling 150 and the notches 148 engage the projections 144 of the collar 142. It is contemplated that notches could be formed in the collar 142 and projections in the support mount 149 to provide an alternate means of holding the support mount 149 stationary with respect to the collar 142. The support mount 149 includes a means of support such as a circumferential flange or ring 168 generally centrally positioned with respect to the lower end of the support mount 149 at a selected distance.

An extension conduit 170 of larger diameter than the support mount 149 slides coaxially over the upper end of the mount 149. The support means or ring 168 provides a means for holding the larger diameter extension conduit 170 above the valve flanges 172 preventing obstruction upon rotation of the drive coupling 150.

As shown in FIGS. 6 and 9, the extension conduit 170 extends upwardly near floor level. In the preferred embodiment a female adapter 172 having a bottom portion 173 of larger diameter than the extension conduit 170 fits coaxially around the upper portion of the extension conduit 170 and is secured thereto by a friction fitted or attached by a means such as glue. The upper portion 171 of the female adapter 172 is of a reduced diameter being joined thereto by a conically shaped reduction section 177, wherein the reduced diameter portion 171 includes internal threads 174 for cooperable engagement with external threads 176 of a clean out plug 178. The plug 178 includes a keyway 179 or a corresponding size and shape of the drive coupling 150. A locator ring 180 is positioned around the top of the plug 178 and rests upon a flange or lip 182 formed on the upper edge of the female adapter 172.

As shown in FIGS. 6 and 9, the female adapter 172 and extension conduit 170 are buried in the soil and or concrete at a depth which provides that the plug 178 and locator ring 180 are positioned flush with the surface of the floor 14. The handle 165 of the rod 166, the screw 164, plug keyway 179, and drive coupling 150 are in alignment with one another so that the user can see the ring indicator and handle and to determine the direction of the flow and whether the valve 112 is open or close.

As shown in FIG. 6 and 9, a check valve assembly 120 comprising a flap 186 having a length greater than the diameter of the pipe 114 and pivoting hinge 188 may be inserted in the to sewer line 114 downstream of the valve 112 as an additional safety precaution to aid in the prevention of backflow of water into the basement of the user.

The foregoing detailed description is given primarily for clearness of understanding and no unnecessary limitations are to be understood therefrom, for modifications will become obvious to those skilled in the art based upon more recent disclosures and may be made without departing from the spirit of the invention and scope of the appended claims.

We claim:

1. A valve adapter assembly for rotating a valve stem of a buried valve connected to a conduit in the open and closed condition, the valve adapter assembly comprising:

a valve collar extending from a main body of said valve, said valve collar defining a first cylindrical body having an upper end including a means for engaging a drive coupling and a lower end defining a collar means for supporting and holding a support mount;

said support mount defining a second cylindrical body extending coaxially around at least a portion of said first cylindrical body of said valve collar, said support mount including means of supporting extending outwardly therefrom, said support mount including means for cooperatively engaging said means for supporting and holding said collar means for supporting and holding a support mount of said valve collar for preventing rotation of said support mount with respect to said valve collar and said valve;

an extension conduit having an upper end and a lower end, at least a portion of said lower end of said extension conduit cooperatively engaging at least a portion of said support mount, said means of supporting extending outwardly from said support mount supporting said lower end of said extension conduit;

said drive coupling defining an upper end and a lower end, at least a portion of said drive coupling being disposed coaxially within said support member and in coaxial engagement with at least a portion of said valve stem, said lower end of said drive coupling including a means for cooperatively engaging said upper end of said collar for limiting rotation of said drive coupling with respect to said collar upon rotation of said valve stem, and said upper end of said drive coupling including means for cooperatively engaging a distal end of a rod defining a key for rotating said drive coupling and said stem in cooperative engagement therewith for opening and closing said valve.

2. The valve adapter assembly of claim 1, including an adapter defining a third cylindrical body having a lower end cooperatively engaging said upper end of said extension conduit and an upper end having means for cooperatively engaging a plug for sealing said adapter when not in use.

3. The valve adapter assembly of claim 2, wherein said upper end of said adapter includes threads and said plug includes threads for threadably engaging said adapter.

4. The valve adapter assembly of claim 2, wherein said plug includes a key-way providing access to said drive coupling and engagement with said rod.

5. The valve adapter assembly of claim 1, wherein said valve is a ball valve.

6. The valve adapter assembly of claim 1, including a check valve assembly comprising a cylinder in cooperative engagement with said conduit, a flap having a length greater than the diameter of said conduit disposed therein, said flap angled toward away from the normal flow of fluid, said flap being pivotally connected to said conduit by a hinge.

7. The valve adapter assembly of claim 1, wherein said means for engaging a drive coupling of said upper end of said first cylindrical body of said valve collar comprises a cutaway portion forming a notch therein.

8. The valve adapter assembly of claim 7, wherein said drive coupling means for cooperatively engaging said upper end of said collar comprises a projection extending downwardly and cooperatively engaging said cutaway portion of said valve collar.

9. The valve adapter assembly of claim 1, wherein said valve collar means for supporting and holding a support mount comprises at least one projection sized, shaped and positioned for engaging said support mount.

10. The valve adapter assembly of claim 1, wherein means of supporting extending outwardly therefrom said support mount is a circumferential flange.

11. The valve adapter assembly of claim 1, wherein said collar means for supporting and holding a support mount comprising a circumferential base flange.

12. The valve adapter assembly of claim 1, wherein said means for cooperatively engaging said means for supporting and holding said collar means for supporting and holding a support mount comprises at least one opening complimentary sized and shaped for cooperative engagement with said means for supporting and holding of said valve collar.

13. The valve adapter assembly of claim 1, wherein said extension conduit extends coaxially around at least a portion of said support mount.

14. The valve adapter assembly of claim 1, wherein said lower end of said extension conduit abuts and is supported by said means of supporting extending outwardly from said support mount.

15. The valve adapter assembly of claim 1, wherein said lower end of said extension conduit abuts and is supported by said means of supporting extending outwardly from said support mount which comprises a circumferential flange.

* * * * *